Jan. 20, 1959 H. J. SOBOLESKI 2,870,029
EYEGLASS CLEANER
Filed May 24, 1957

INVENTOR.
HENRY J. SOBOLESKI
BY M. A. Hobbs
ATTORNEY

2,870,029

EYEGLASS CLEANER

Henry J. Soboleski, South Bend, Ind.

Application May 24, 1957, Serial No. 661,536

3 Claims. (Cl. 106—5)

The present invention relates to a cleaning compound and more particularly to compounds for cleaning eyeglasses, goggles, eye shields and the like.

In normal use of glasses in the home, on the street and in business, the type of dirt and film which collect on the lenses and obliterate the view consist of skin oil, dust, lint and smoke and can readily be removed by merely moistening the lens and then rubbing the two surfaces with a clean cloth. Preparations are on the market which will also readily remove the aforesaid relatively easily removed foreign matter. However, in many industrial plants corrosive chemicals, lacquers, paint and oil laden dust permeate the air and coat the lenses of the glasses worn by the workers. These foreign materials often form a hard dry film which is not readily removed by moisture and a cleaning cloth and which if permitted to remain on the lens often permanently damage the lens surface. It is therefore one of the principal objects of the present invention to provide a cleaning compound in convenient form for easily and thoroughly cleaning eyeglasses, goggles, eye shields and the like of foreign matter of the aforementioned types.

Another object of the invention is to provide an abrasive cleaning compound in the form of a wax material for eyeglasses and the like, which can be molded or otherwise shaped into a stick and dispensed in a convenient capsule-like container.

Still another object of the invention is to provide a cleaning compound for eyeglasses which will remove adherent films of foreign matter without the use of moisture or other liquid material.

A further object of the invention is to provide a cleaner for eyeglasses in a form which can easily be carried on the person and applied to the lens without the use of any special cloth, paper or other material and which thereafter during the day makes cleaning by simply wiping with a cloth an effective method of thoroughly cleaning the lens.

Figure 1:
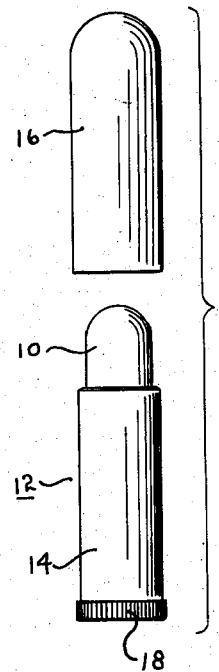
Figure 2:
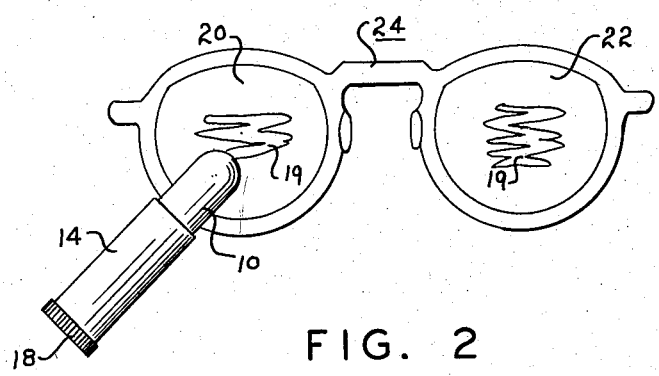

Additional objects and advantages will become apparent from the following description and accompanying drawings, wherein:

Figure 1 is an elevational view of a dispenser for my cleaning compound showing the compound in the form of a stick partially extended from the container, and the cap of the container removed; and Figure 2 is an elevational view of a pair of eyeglasses illustrating the manner in which my cleaning compound is normally applied to the lens.

Referring more specifically to the drawing, my composition for eyeglasses, goggles, eye shields and the like is shown in the form of a stick 10 mounted in a suitable dispenser 12 consisting of a barrel 14 and a cap 16. For the purpose of the present invention the dispenser may be considered a conventional cosmetic type dispenser, such as the kind extensively used for lipstick, and includes a mechanism in the barrel operated by rotating the bottom or lower flange 18 to extend and retract the stick 10 of cleaning compound. When the cleaning compound is to be used, cap 16 is removed from the dispenser and flange 18 rotated until the cleaning stick 10 is extended to the position shown in Figures 1 and 2. While the stick is in this position the cleaning compound is applied to both surfaces of the lens by rubbing the surfaces with the end of the stick, such as in a criss-cross, circular, or zig-zag pattern 19, as shown in Figure 2 on lenses 20 and 22 of eyeglasses 24. Normally only a few marks with the stick are required to apply sufficient compound to the lens to accomplish a satisfactory cleaning operation. After the compound has been applied as described, the lenses are wiped with a clean cloth first distributing the compound over the entire surface and then rubbing the surface sufficiently to remove the film of solidified chemicals, grease and lacquers.

My cleaning compound consists of three principal ingredients, namely paraffin wax, jewelers' rouge and cornstarch. While these ingredients can be present in varying amounts to produce an effective cleaning compound the preferred specific compound contains by weight approximately eighty to eighty-two percent (80%–82%) paraffin wax, about three to four percent (3%–4%) jewelers' rouge and about fifteen to seventeen percent (15%–17%) cornstarch. A specific composition which has been found particularly suitable for general industrial use and the like consists of eighty one percent (81%) paraffin wax, three and one half percent (3½%) rouge, and fifteen and one half percent (15½%) starch, the rouge and starch being thoroughly dispersed throughout the paraffin wax. The paraffin used in the composition may be any of the hydrocarbons or hydrocarbon mixtures of the methane series which are solid and preferably pliable at room temperature. The well known and extensively used commercial paraffin is satisfactory. The jewelers' rouge consists of either ferric oxide or ferrous oxide or a mixture of these two oxides and is readily available commercially. The proportion of the oxides in the rouge are not critical for satisfactory use of my cleaning compound. The rouge acts as the abrasive in my composition to cut, scratch and loosen the solidified foreign matter on the lens. The rouge has sufficient hardness to effectively remove the deposited foreign matter on the lens without scratching or otherwise damaging the lens' surfaces. The paraffin wax acts as a carrier for the rouge and also for the foreign matter loosened by my compound. The cornstarch renders the wax sufficiently dry that the compound can be readily wiped from the lens leaving only an extremely thin film of wax which interferes with the formation of new film of foreign matter and the adherence of industrial chemicals and other foreign matter to the surface of the lens, without in any way interfering with the vision. Continued wiping of the lens with a clean cloth will remove substantially all of the residual wax film on the lens; however, while this film is present, the lens can readily and effectively be cleaned by merely wiping the cloth over the lens surfaces. The thin wax film also prevents the formation and collection of moisture and steam on the surfaces of the lens.

In the preparation of my compound, the paraffin wax is melted and to the liquid wax is added the rouge and cornstarch while the liquid is being thoroughly stirred. The stirring is continued as the mixture cools until the mixture has solidified. The stirring throughout the cooling period assures a thorough dispersion of the rouge and starch in the paraffin wax. The compound prepared in the foregoing manner is solid though somewhat plastic so that it can be extruded or molded with moderate pressure into the desired shapes, such as the stick 10 used in the dispenser.

While the present cleaning compound has been illustrated in the form of a stick in a capsule-like dispenser, various other shapes either with or without dispensers may be used if desired. Other changes and modifications can be made to suit requirements.

I claim:

1. A composition for cleaning eyeglasses and the like, consisting essentially of a mixture of about eighty-one percent (81%) paraffin wax, three and one half percent (3½%) rouge containing principally ferric oxide, and fifteen and one half percent (15½%) cornstarch, said rouge and starch being thoroughly dispersed in said wax.

2. A composition for cleaning eyeglasses and the like, consisting essentially of a mixture of approximately eighty to eighty-two percent (80%-82%) paraffin wax, three to four percent (3%-4%) rouge containing ferric oxide, and fifteen to seventeen percent (15%-17%) cornstarch, said rouge and starch being thoroughly dispersed in said wax.

3. A composition for cleaning eyeglasses and the like, consisting essentially of a mixture of about eighty to eighty-two percent (80%-82%) paraffin wax, three to four percent (3%-4%) rouge containing principally ferric oxide, and fifteen to seventeen percent (15%-17%) starch.

References Cited in the file of this patent

UNITED STATES PATENTS

| | | |
|---|---|---|
| 215,757 | Kiesele | May 27, 1879 |
| 2,000,487 | Koch | May 7, 1935 |

FOREIGN PATENTS

| | | |
|---|---|---|
| 9,740 of 1913 | Great Britain | Apr. 9, 1914 |